US006573893B1

(12) United States Patent
Naqvi et al.

(10) Patent No.: US 6,573,893 B1
(45) Date of Patent: Jun. 3, 2003

(54) VOXEL TRANSFER CIRCUIT FOR ACCELERATED VOLUME RENDERING OF A GRAPHICS IMAGE

(75) Inventors: Hasan Shahzad Naqvi, Ft Collins, CO (US); Jeff William Burrell, Fort Collins, CO (US); Barthold Lichtenbelt, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 09/704,185

(22) Filed: Nov. 1, 2000

(51) Int. Cl.$^7$ ................................................ G06T 17/00
(52) U.S. Cl. ...................................................... 345/424
(58) Field of Search ................................. 345/418, 419, 345/424, 420, 423, 426, 427, 428

(56) References Cited

U.S. PATENT DOCUMENTS 6,426,749 B1 * 7/2002 Knittel et al. ............... 345/424
6,441,821 B1 * 8/2002 Nagasawa ................... 345/426

* cited by examiner

Primary Examiner—Cliff N. Vo

(57) ABSTRACT

A voxel transfer circuit that implements high-speed voxel transfer operations. When implemented in a 2D or 3D texture mapping circuit of a graphics system, or in a graphics card adapter of a workstation, the voxel transfer circuit provides a comprehensive, accelerated volume rendering capability to the existing imaging pipeline. For each voxel in a volume data set, the voxel transfer circuit generates a texel having an opacity value and a color value based on one or more properties of the voxel including the local gradient magnitude and a lighting model. The relationship between these values is referred to herein as a classification or transfer function. In the present invention, the voxel transfer circuit implements a transfer function that employs a gradient-influenced classification. Such a transfer function generates opacity and color values of structures with excellent edge and surface discrimination. Preferably the voxel transfer circuit also includes the influence of a lighting model on the voxel, providing improved three-dimensional clarity and depth cues. As a result, the present invention enables existing systems to perform complete volume rendering at accelerated texture mapping speeds. Thus, the invention allows for modifications to the parameters used during the voxel transfer process, enabling the operator to interactively modify the results of the volume rendering operations at accelerated rates. This allows graphics applications to expand the use of volume rendering while also providing operators with the ability to interactively explore different ways of visualizing their 3D volume data. Thus, the present invention enables the operator to re-render the voxel repeatedly, gradually modifying the transfer function in small increments and view the results of the modification in a sequence of volume-rendered frames that are rendered quickly.

20 Claims, 7 Drawing Sheets

100
COMPUTER GRAPHICS ENVIRONMENT

100
COMPUTER GRAPHICS ENVIRONMENT

FIG. 4A

| INTENSITY | | GRADIENT | | |
|---|---|---|---|---|
| Iubv | SCALAR INTENSITY | Gx | Gy | Gz |
| 31 30 | 29 28 27 26 25 24 23 22 21 20 19 18 | 17 16 15 14 13 12 | 11 10 9 8 7 6 | 5 4 3 2 1 0 |
| | | | | |

301 VOXEL

FIG. 4B

323 TEXEL

| OPACITY (ALPHA) | COLOR | | |
|---|---|---|---|
| | RED | GREEN | BLUE |
| 31 30 29 28 27 26 25 24 | 23 22 21 20 19 18 17 16 | 15 14 13 12 11 10 9 | 8 7 6 5 4 3 2 1 0 |
| | | | |

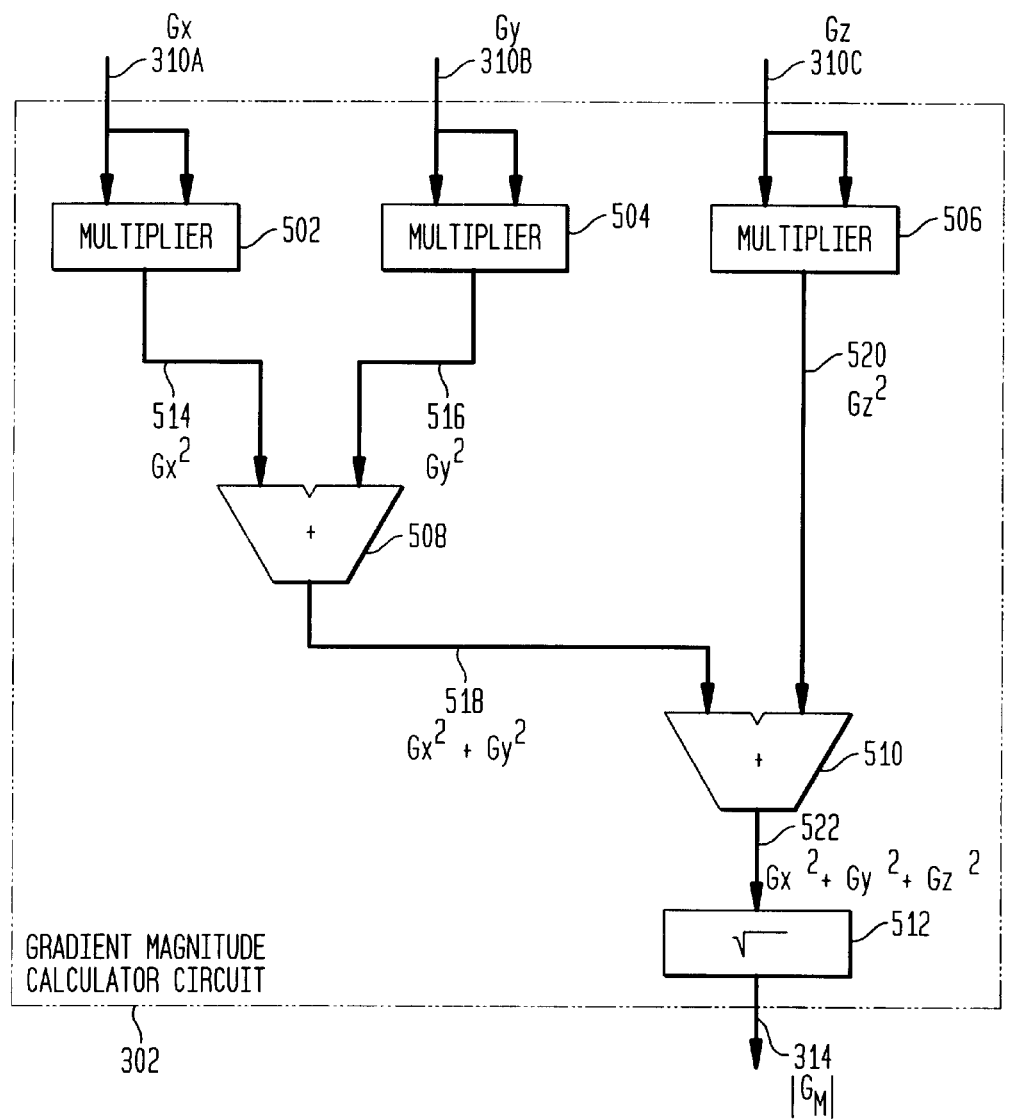

FIG. 6

TABLE INDEX
602

INDEX = 1
|Gm| = 3F
INTENSITY = 8F

| OPACITY | RED | GREEN | BLUE |
|---------|-----|-------|------|
| FF | φ | φF | φF |
| FF | φ | φF | φF |
| FF | φ | φF | φF |
| ⋮ | ⋮ | ⋮ | ⋮ |
| 0 | FF | φ | φ |
| AF | 1φ | 3Z | 7F |
| AF | 1φ | 3Z | 7F |
| ⋮ | ⋮ | ⋮ | ⋮ |
| ZZ | 4F | FF | φ |
| ZZ | 4F | FF | φ |
| ZZ | 4F | FF | φ |
| ⋮ | ⋮ | ⋮ | ⋮ |

608 — OPACITY
610 — RED
612 — GREEN
614 — BLUE

600
CLASSIFICATION
LOOK-UP TABLE

US 6,573,893 B1

VOXEL TRANSFER CIRCUIT FOR ACCELERATED VOLUME RENDERING OF A GRAPHICS IMAGE

BACKGROUND OF THE INVENTION

1. Field of the Invention

The present invention relates generally to computer graphics systems and, more particularly, to volume rendering in a computer graphics system.

2. Related Art

Computer graphics systems are commonly used for displaying two- and three-dimensional graphics representations of objects on a two-dimensional display screen. Current computer graphics systems provide highly detailed representations and are used in a variety of applications.

Volume rendering is an important branch of computer graphics, following behind the development of geometric rendering and pixel rendering. Volume rendering is a method for directly rendering a volume data set, or volume, to show the characteristics of the interior of a solid object when displayed on a two-dimensional computer monitor or other output device.

A volume data set is a three-dimensional array of data points referred to as volume elements, or voxels. A voxel can be thought of as the three-dimensional analogue of a pixel. A voxel is a three-dimensional volume element representing a discrete sample of a volume in three-dimensional space. Voxels are commonly defined as sample points separated by a finite distance, with each voxel having a position and a value. The position of a voxel specifies the x,y,z coordinates of the center of the voxel in the 3D volume data set. The value of the voxel depends on its format. For example, a voxel can have an intensity element and an index element. These elements are usually treated differently in the volume rendering process.

Volume data sets can be generated by numerous means, but most commonly by some method of three-dimensional scanning or sampling and by numerical modeling. For example, a volume data set may be generated by magnetic resonance imaging (MRI), wherein the density of human or animal tissue is computed at each point of a 3D grid. A display of this information could indicate the boundaries of the various types of tissue, as indicated by density changes. Volume rendering is the process by which this data is displayed on a 2D graphics device. The text "Introduction to Volume Rendering" by Barthold Lichtenbelt, Randy Crane and Shaz Naqvi, Prentice Hall PTR, 1998, provides a comprehensive introduction to volume rendering, and is hereby incorporated by reference herein in its entirety.

To render a 2D representation of a 3D volume data set, the volume rendering system passes imaginary rays emanating from a pixel on an image plane through the volume data set. As each ray travels through the data, the volume rendering system calculates the intensity of each data point, or datum, traversed by the imaginary ray. The volume rendering system uses a compositing function to generate a single accumulated value from the resulting texel values. These accumulated values are then used to project the volume data set onto a two-dimensional space to form a two-dimensional representation of the three-dimensional volume data set. Certain data points in the three-dimensional volume data set can be made transparent or translucent in varying degrees by changing the classification function, allowing internal features of interest to become visible when rendered.

Volume data sets are quite large and, as a result, can place a strain on system responses. A typical volume data set from an MRI scanner, for example, can contain as many as 6.7 million voxels, whereas a typical polygon data set for geometric rendering contain fewer than 0.5 million polygons. As a result, conventional graphics systems typically implement volume rendering operations in software. Such implementations, however, have exhibited poor performance when used to render large volume data sets. For example, it is not uncommon for software-based volume rendering system to take up to several minutes to completely render a single image of a large volume data set. Thus, there is a need in the art for a more efficient approach to volume rendering.

SUMMARY OF THE INVENTION

The present invention is directed to a voxel transfer circuit that implements high-speed voxel transfer operations. As such, when implemented in a 2D or 3D texture mapping circuit of a graphics system, or a graphics card adapter of a workstation, the present invention provides a comprehensive, accelerated volume rendering capability to the existing texture mapping pipeline. For each voxel in a volume data set, the voxel transfer circuit generates a texel having an opacity value and a color value based on one or more properties of voxel including the local gradient magnitude and a lighting model. The relationship between these values is referred to herein as a classification or transfer function. In the present invention, the voxel transfer circuit implements a transfer function that employs a gradient-influenced classification. Such a transfer function generates opacity and color values of structures with excellent edge and surface discrimination. Preferably the voxel transfer circuit also includes the influence of a lighting model on the voxel, providing improved three-dimensional clarity and depth cues.

As a result, the present invention enables existing systems to perform complete volume rendering at accelerated texture mapping speeds. Thus, the invention allows for modifications to the transfer function during successive voxel transfer operations, enabling the operator to interactively modify the results of the volume rendering operations at accelerated rates. This allows graphics applications to expand the use of volume rendering. The present invention also provides operators with the ability to interactively explore different ways of visualizing their 3D volume data. That is, the present invention enables the operator to re-render a voxel repeatedly, gradually modifying the transfer function in small increments, viewing the results of the modification in a sequence of volume-rendered frames that are rendered quickly.

A number of aspects of the invention are summarized below, along with different embodiments that may be implemented for each of the summarized aspects. It should be understood that the embodiments are not necessarily inclusive or exclusive of each other and may be combined in any manner that is non-conflicting and otherwise possible. It should also be understood that these summarized aspects of the invention are exemplary only and are considered to be non-limiting.

In one aspect of the invention, a voxel transfer circuit for processing a volume element is disclosed. The volume element has an intensity component and a gradient component. The voxel transfer circuit includes a gradient magnitude calculator circuit that receives a signal corresponding to the gradient component, and that generates a signal corresponding to a magnitude of the received gradient component. A classification circuit of the voxel transfer circuit receives a signal corresponding to the intensity component and the gradient magnitude signal, and generates a first signal corresponding to an opacity value and a second signal corresponding to a color value. Preferably, the voxel transfer circuit also includes a shader circuit that receives the gradient component signal and generates a signal corresponding to an attenuation factor based on a predetermined lighting model, as well as a multiplier that receives the color value signal and the attenuation factor signal, and generates a signal corresponding to the product of the color value and attenuation factor. Preferably, the classification circuit comprises a data array associating the opacity and color values with the intensity and gradient component values.

In another aspect of the invention, a volume rendering system is disclosed. The volume rendering system includes a voxel transfer circuit constructed and arranged to process a volume element including an intensity component and a gradient component. The voxel transfer circuit includes a gradient magnitude calculator circuit constructed and arranged to receive a signal corresponding to the gradient component, and to generate a signal corresponding to a magnitude of the gradient component. A classification circuit is also included. The classification circuit is constructed and arranged to receive a signal corresponding to the intensity component and the gradient magnitude signal, and to generate a first signal corresponding to an opacity value and a second signal corresponding to a color value. The voxel transfer circuit preferably also includes a shader circuit constructed and arranged to receive the gradient component signal and to generate a signal corresponding to an attenuation factor based on an implemented lighting model. A multiplier is implemented to receive the color value signal and the attenuation factor signal, and to generate signal corresponding to the product of the color value and the attenuation factor. In a still further aspect of the invention, a volume rendering system configured to implement a volume rendering pipeline is disclosed. The volume rendering system includes a texture mapping unit; a texture mapping memory operatively coupled to the texture mapping unit; and a voxel transfer circuit operatively coupled to both, the texture mapping unit and the texture mapping memory. The voxel transfer circuit processes a volume element having an intensity component and a gradient component. The voxel transfer circuit can be configured as noted above.

In another aspect of the invention, a circuit-based method for processing each of a plurality of voxels in a volume data set to generate a corresponding texel is disclosed. Each voxel includes an intensity component and a gradient component. The method includes: (1) determining a magnitude of the gradient component; (2) determining an opacity value of the resulting texel based on the intensity component and the magnitude of the gradient component; and (3) determining a color value based on the intensity component and the magnitude of the gradient component.

In one embodiment, the gradient component includes a x-component, y-component and z-component. Here, determining a magnitude of the gradient component includes calculating the magnitude of the gradient component using the relationship:

$$G_M = \left| \sqrt{G_X^2 + G_Y^2 + G_Z^2} \right|,$$

where, $G_M$ is the magnitude of the gradient component, and $G_X$, $G_Y$ and $G_Z$ are the x-, y- and z- gradient components, respectively.

In another embodiment, determining an opacity value includes: (a) storing a look-up table of a plurality of data associations, each such association including voxel intensity and gradient magnitude values associated with texel opacity and color values; (b) receiving a signal corresponding to the intensity component and the signal corresponding to the gradient magnitude; and (c) accessing the look-up table with the intensity and gradient magnitude values to retrieve the associated opacity value. The same process can be used to determine the color value.

Various embodiment of the present invention provide certain advantages and overcome certain drawbacks of the above and other conventional techniques. Not all embodiments of the present invention share the same advantages and those that do may not share them under the same or similar circumstances. Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The present invention is pointed out with particularity in the appended claims. The above and further features and advantages of this invention may be better understood by referring to the following description when taken in conjunction with the accompanying drawings, in which:

FIG. 4A is a diagram illustrating the configuration of a voxel in accordance with one embodiment of the present invention.

FIG. 4B is a diagram illustrating the configuration of a texel in accordance with one embodiment of the present invention.

FIG. 5 is a circuit block diagram of one embodiment of the gradient magnitude calculator circuit illustrated in FIG. 3.

FIG. 6 is a diagram of one embodiment of a look-up table implementation of the classification circuit illustrated in FIG. 3.

DETAILED DESCRIPTION

I. Exemplary Graphics System Environment

A. System Architecture

Figure 1A:
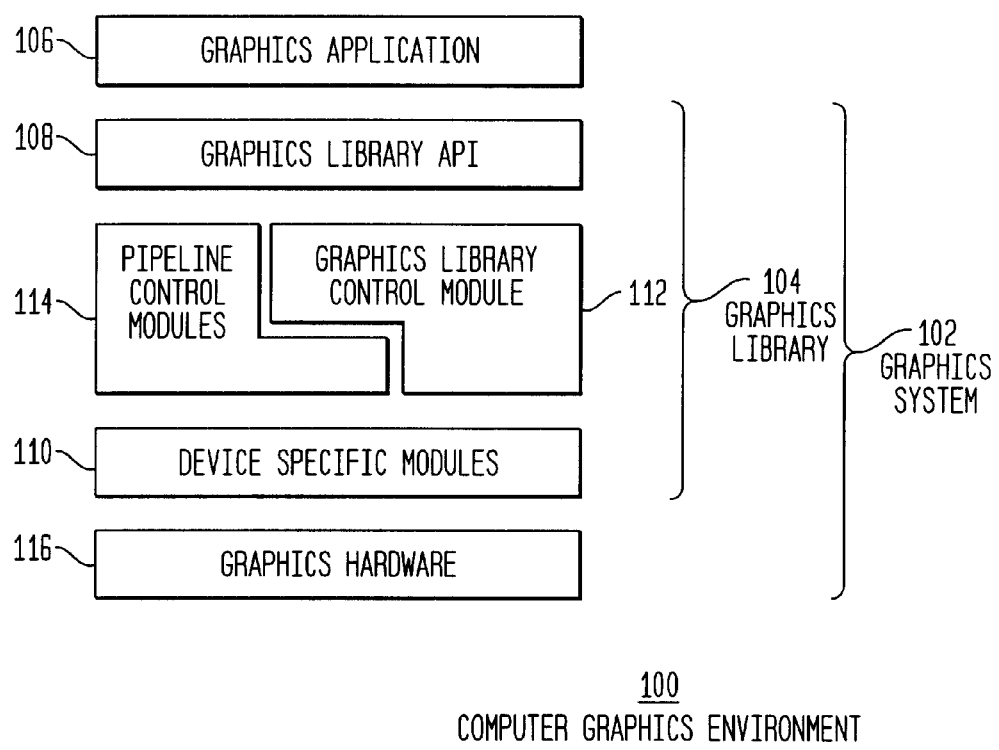
FIG. 1A is an architectural block diagram of an exemplary computer graphics environment suitable for incorporation of the volume transfer circuit circuitry and methodology of the present invention.

FIG. 1A is an architectural block diagram of an exemplary computer graphics environment 100 suitable for incorporation of the volume rendering system and methodology of the present invention. As shown, a graphics system 102 provides a computer platform on which software applications such as graphics application 106 execute. Graphics system 102 communicates with and is responsive to graphics application 106. Computer graphics system 102 includes a graphics library 104 and device-specific modules 110 through which graphics application 106 controls graphics hardware 116.

Graphics library 104 provides an application program interface (API) 108 of function calls through which graphics application 106 communicates with graphics library 104. Graphics library API 108 enables graphics application 106 to control efficiently graphics system 102. Graphics library API 108 is preferably a streamlined, hardware-independent interface designed to be implemented on many different computer platforms of which graphics system 102 is just one example. In graphics environment 100, graphics library 104 provides specific function calls that are used to specify objects and operations to produce interactive, three-dimensional applications. As such, graphics application 106 issues function calls to computer graphics system 102 according to the specifications defined by API 108 without knowledge of the configuration of the underlying graphics hardware 116.

In one embodiment, graphics library API 108 is an OpenGL® API which provides a graphics library of low-level graphics manipulation commands for describing models of three-dimensional objects. The OpenGL standard is described in the "OpenGL Programming Guide," version 1.1 (1997), the "OpenGL Reference Manual," version 1.1 (1997) and the "OpenGL Specification," version 1.1 (1997), all of which are hereby incorporated by reference in their entirety.

The OpenGL software interface provides specific commands that are used to specify objects and operations to produce interactive graphics systems. OpenGL is a streamlined, hardware-independent interface designed to be implemented on many different hardware platforms. As such, in computer systems that support OpenGL, the operating systems and graphics applications can make function calls to the computer graphics system according to the standardized API without knowledge of the underlying hardware configuration. As one skilled in the relevant art will find apparent, graphics library API 108 may be any other proprietary or publicly available graphics library such as the commonly-available PEX (PHIGS Extension to X) library available from, for example, the X-Consortium. Graphics application 106 may be any graphics software application now or later developed that is capable of communicating with the graphics system 102 through the implemented graphics library API 108. Such graphics applications may be, for example, a database application, a CAD/CAM application, an architectural design application, a civil engineering application, a word processing package, or the like.

Graphics library 104 includes a graphics library control module 112 and multiple pipeline control modules 114. Graphics library control module 112 performs well-known functions such as managing publicly visible graphics library state information and informing other components of graphics library 104 of state changes. Graphics library control module 112 performs generally graphics library functions defined by API 108 and maintains corresponding data structures that store the noted state information. Graphics library 104 may be implemented, for example, using the C programming language.

Pipeline control modules 114 perform well-known operations associated with the control of the graphics pipeline. Pipeline control modules 114 maintain derived internal graphics state information and provide such state information to device-specific modules 110 and graphics hardware 116. Operations include, for example, scheduling operators, buffering vertex API data and executing operators on primitives to generate data for rasterizers located in graphics hardware 116. These functions and operations are well known in the art.

Device-specific modules 110 provide primitive, pixel and volume data, including vertex state (coordinate) and property state (color, lighting, etc.) data to graphics hardware 116. Graphics hardware 116 may be any well-known graphics hardware such as the Visualize FX4 Graphics System, available from Hewlett-Packard Company, Palo Alto, Calif. Computer graphics system 102 is typically a high performance workstation such as the HP Visualize Workstation also manufactured and sold by Hewlett-Packard Company. The computer graphics system preferably implements the HP-ux operating system, which is a UNIX based operating system. It will be understood that any workstation or other computer having similar capabilities may be utilized within the scope of the present invention. For example, the present invention can be implemented in a personal computer executing a Windows operating system.

B. Rendering Pipeline

Various techniques have been employed to improve the performance of graphics systems. Due to the large number of at least partially independent operations that are performed to render a graphics image, proposals have been made to use some form of parallel architecture for graphics systems. One common approach to achieving parallelism in computer graphics processing is a techiuque known as pipelining. In a pipelined architecture, individual processing stages are, in effect, connected in series in an assembly-line configuration. One processing stage performs a first set of operations on one set of data and passes that data along to another processing stage. This next processing stage performs a second set of operations while at the same time the first processing stage performs again the first set of operations on another set of data.

Figure 1B:
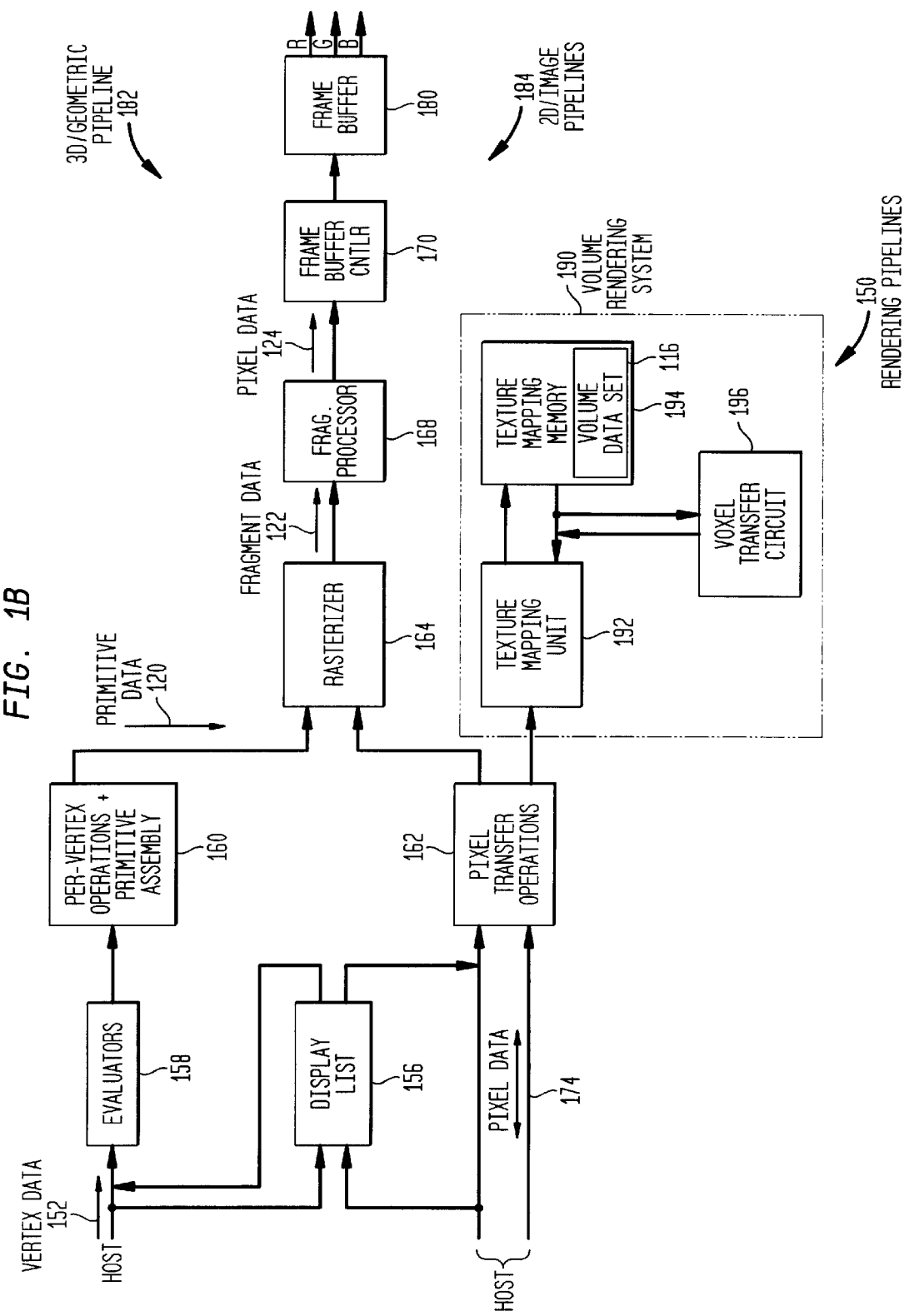
FIG. 1B is a functional block diagram of an exemplary graphics rendering pipeline suitable for incorporation of the volume rendering system and methodology of the present invention.

In one exemplary graphics environment, graphics hardware 116, device specific modules 110 and pipeline control module 114 define a pipelined graphics architecture. FIG. 1B is a functional block diagram of one example of such a rendering pipeline 150 implemented in accordance with the OpenGL graphics library specification. Rendering pipeline 150 is commonly referred to as an OpenGL graphics pipeline or, more generally, a rendering pipeline. The present invention will be described with reference to this rendering pipeline implementation. It should become apparent to those of ordinary skill in the art, however, that the present invention may be implemented in any graphics rendering pipeline now or later developed as well as in other non-pipelined architectures implemented in graphics systems, high-end workstations and personal computers configured to generate graphics images, among other platforms.

There are two paths through rendering pipeline 150: a geometric or three-dimensional (3D) pipeline 182 and an imaging or two-dimensional (2D) pipeline 184. Geometric pipeline 182 (also referred to herein as geometry pipeline 182) creates a two-dimensional image from one or more model views constructed from geometric primitives defined by primitive data 152. Primitive data 152 is processed to form a two-dimensional image for display on a two-dimensional display screen. On the other hand, imaging pipeline 184 (also referred to herein as image pipeline 184)

manipulates pixel data 154 representing pixels, images and bitmaps of two-dimensional images. As will be described in greater detail below, rendering pipeline 150 of the present invention includes a volume rendering system 190 that performs high-speed volume rendering operations in accordance with the present invention.

Vertex or geometric data 152 (vertices, lines, and polygons) are transferred through the processing stages forming geometric pipeline 182 including evaluators processing stage 158 and per-vertex operations/primitive assembly processing stage 160. Pixel data 154 (pixels, images and bit maps) is processed by pixel transfer processing stage 162 of imaging pipeline 184. Thereafter, pixel data 154 and primitive data 120 are processed by rasterizer stage 164 and fragment operations stage 168. Resulting pixel data 124 is stored in a frame buffer 180 by a frame buffer controller 170 for subsequent display on a monitor or other output device. The processing stages of geometric pipeline 182 are configured in accordance with the specified OpenGL rendering pipeline as described in the "OpenGL Programmer's Guide," "OpenGL Specification," and "OpenGL Reference Manual" incorporated herein by reference, and are therefore discussed only briefly below.

All data, whether it represents primitives (vertex data 152) or pixels (pixel data 154) can be processed immediately in pipeline 150. Alternatively, data 152, 154 can be saved in a display list 156 for current or later use. When a display list 156 is executed, the retained data is sent from display list 156 as if it were sent by graphics application 106 to be processed immediately.

All geometric primitives are eventually described by vertices. Parametric curves and surfaces may be initially described by control points and polynomial functions. Evaluators processing stage 158 performs operations to derive the vertices used to represent the surface from the control points.

Vertex data 152 then enters the per-vertex operations and primitive assembly processing stage 160 at which the vertices are converted into primitives. Here, spatial coordinates are projected from a position in three-dimensional space to a position on the two-dimensional display screen. In the illustrative embodiment wherein texturing is used, texture coordinates are generated and transformed at processing stage 192. If lighting is enabled, lighting calculations are performed using transformed vertex, surface normal, light source position, material properties, and other lighting information to produce a color value. Processing stage 160 also performs clipping, viewpoint and depth operations, among other functions. The results of pixel operations processing stage 162, referred to as primitive data 120, includes complete geometry primitives, which are the transformed and clipped vertices with related color, depth, and sometimes texture-coordinate values and guidelines for rasterization processing stage 164.

Referring to image pipeline 184, pixel data 154 is first processed by pixel transfer operations processing stage 162. Pixels from system memory or frame buffer 180 are first unpacked from one of a variety of formats into the proper number of components. The pixel data is then scaled, biased and processed by a pixel map. The results are clamped and then either written into a texture mapping memory 194 or sent to rasterization processing stage 164.

Rasterization processing stage 164 is shared by geometric pipeline 182 and imaging pipeline 184. In rasterization processing stage 164, primitive data 120 is converted into fragments. Each fragment square corresponds to a pixel in frame buffer 180. Pixel data 154 is a special type of fragment with no associated depth, texture or fog components. Line and polygon stipples, line width, point size, shading model and coverage calculations to support antialiasing are taken into consideration as vertices are connected into lines or the interior pixels are calculated for a filled polygon. Color, texture, fog and depth values are assigned for each fragment square in rasterization processing stage 164.

Fragment processing stage 168 generates pixel data to be written into frame buffer 180 by frame buffer controller 170 for subsequent rendering on a two-dimensional display screen. In fragment processing stage 168, a series of optional operations are performed that may alter or eliminate fragments. These operations, which can be enabled or disabled individually, include texturing, fog calculations, scissor testing, alpha testing, stencil testing and depth testing. Blending, dithering and masking operations follows these tests. All of these operations are considered to be well known in the art.

In accordance with aspects of the present invention, imaging pipeline 184 also renders volume data sets. Volume rendering system 190 includes a texture mapping unit 192 that generates texture data as is well known in the art. In accordance with the present invention, a voxel transfer circuit 196 is also included in volume rendering system 190 to accelerate the processing of volume data sets as described in detail below.

II. Volume Rendering System

Volume rendering system 190 will be first described in terms of the operations performed in a pipelined architecture. Then, a circuit implementation of voxel transfer circuit 196 is described, followed by exemplary circuits of specific components of the exemplary circuit 196.

A. Volume Rendering Pipeline

Figure 2:
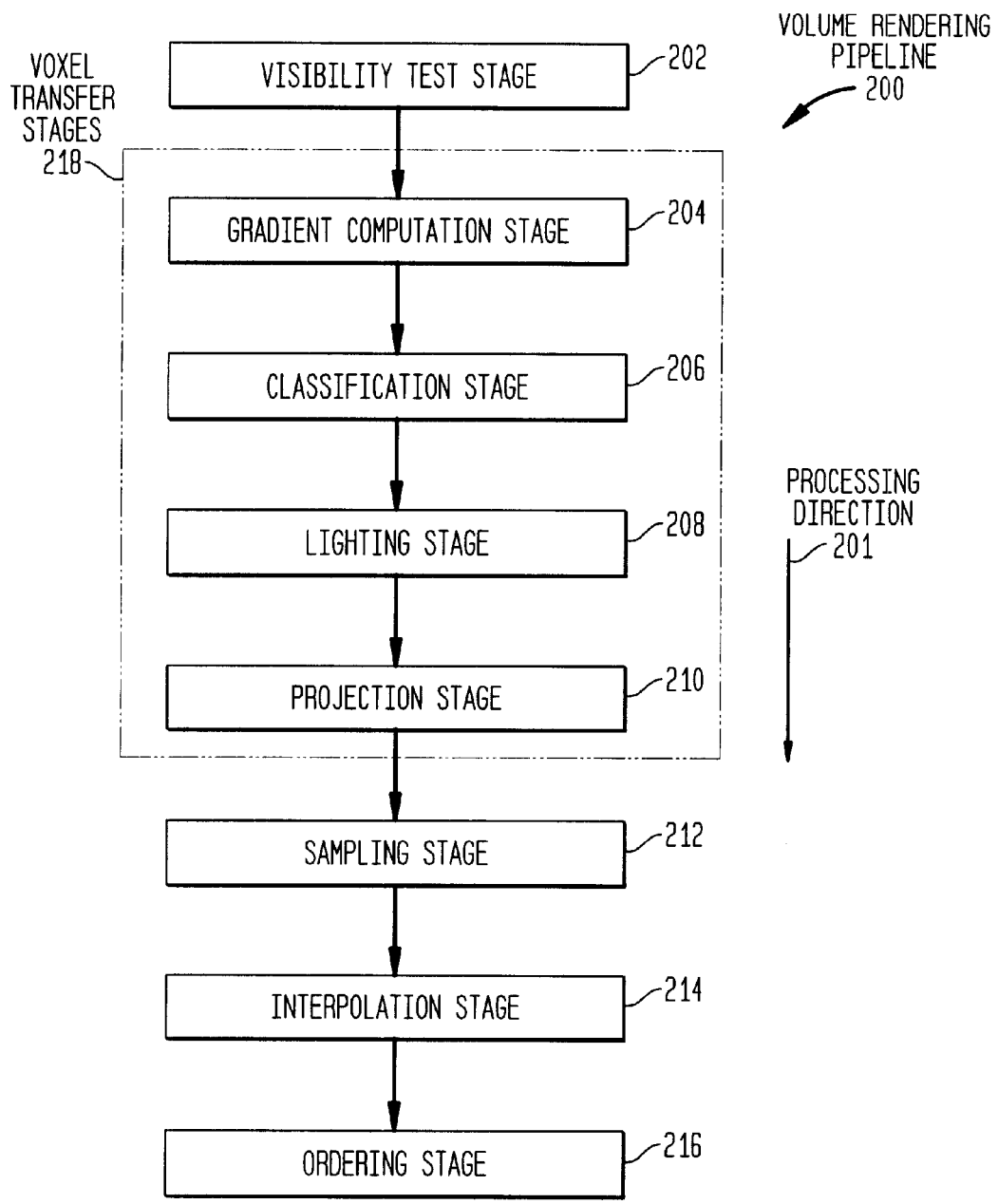
FIG. 2 is a block diagram of a volume rendering pipeline that can be implemented in one embodiment of the volume rendering system illustrated in FIG. 1B.

FIG. 2 is a block diagram of a the operations performed by volume rendering system 190. Volume rendering system 190 performs sequential volume rendering operations the sequence of which defines a volume rendering pipeline 200. As such, each operation performed in volume rendering pipeline 200 is referred to as a stage. The voxels in volume data set 140, stored in texture mapping memory 194 are input to the first stage 202 of volume rendering pipeline 200 and are sequentially processed by each succeeding stage of the pipeline. The last stage of volume rendering pipeline 200 generates pixels that may be provided to an output device such as a monitor or a printer to display a two-dimensional representation of volume data set 140.

The first stage in volume rendering pipeline 200 is a visibility test stage 202. Visibility test stage 202 determines which voxels in volume data set 140 are to be rendered on the destination output device. For example, if volume rendering system 190 is being used in conjunction with the OpenGL standard, whether to render a voxel can be determined based on OpenGL clipping planes. Clipping planes are well-known entities used to define regions in three-dimensional space within which an image should be rendered, and outside of which an image should not be rendered. Visibility test stage 202 tags those voxels in volume data set 140 which do not fall within a region defined by the current model clipping planes to indicate that the tagged voxel should not be rendered. As one of ordinary skill in the art would appreciate, in an alternative embodiment, visibility test stage 202 can be performed as a pre-processing operation prior to execution of volume rendering pipeline 200.

The next three stages of volume rendering pipeline 200 are gradient computation stage 204, classification stage 206 and lighting stage 208. Collectively, these three stages are referred to as the voxel transfer stages 218. In accordance with various aspects of the present invention, one or more voxel transfer stages 218 are implemented in voxel transfer circuit 196.

Gradient computation stage 204 computes a gradient for each voxel in volume data set 116. In the disclosed embodiments, each gradient includes x, y and z components. The gradient is a measure of the direction and rate of change of the intensity of the voxel. The gradient, therefore, can provide an indication of the location of edges or boundaries between neighboring voxels that represent different types of materials. The direction of the gradient indicates the orientation of the boundary.

The gradient of a voxel may be calculated by, for example, computing the central difference using the intensity of the voxel and the intensities of the voxel's six nearest neighbors. This and other gradient calculation techniques are considered to be well known in the art and are not described further herein. It should also be understood that gradient computation stage 204 may not be performed under all circumstances such as when a voxel format contains no intensity component or when the voxel format contains an explicit gradient value.

Classification stage 206 of volume rendering pipeline 200 assigns a color value and an opacity value to each voxel in volume data set 116. The color value may include, for example, red, green and blue (RGB) component values. The opacity value of a voxel is a measure of the translucency of the material represented by the voxel. The opacity value is typically a number between one and zero that corresponds to the quantity of the light that falls on a voxel which will be absorbed by that voxel. A value of zero corresponds to complete transparency while a value of one represents complete opacity.

A lighting stage 208 receives as its input the output of the classification stage 206; that is, a voxel with assigned color and opacity values. Lighting stage 208 applies a lighting equation to yield final color values for the voxel. Lighting stage 208 may, for example, multiply the voxel's current RGB values by an attenuation factor based on the light that shines on the voxel, the angle between the viewer and the light, the voxel's material properties and the voxel's orientation and position in space.

A projection stage 210 projects voxels onto a plane to generate a two-dimensional representation of volume data set 140 in which each voxel is assigned x and y window coordinates. In OpenGL, for example, volume data sets can be rendered using either a perspective projection, in which objects that are farther away appear smaller in the two-dimensional representation than objects that are closer, or an orthographic projection which maps objects directly onto the two-dimensional representation without adjusting their relative size.

At the time the sampling stage of the volume rendering pipeline 200 is reached, each voxel contains a color (RGBA) and a location expressed in window coordinates. Typically, the RGBA value for each voxel does not correspond to the RGBA value of any particular pixel that will be used to render part of or all of the voxel. Instead, sampling stage 212 passes rays, originating from a predetermined viewpoint, through volume data set 140. A set of sample points along each ray is generated and the set of RGBA values from the voxel or voxels nearest each sample point is used to calculate the RGBA value for the sample points.

Interpolation stage 214 determines which voxel or voxels are to be used to calculate the RGBA value for each sample point. For example, interpolation stage 214 may determine that the voxel nearest a sample point is to be used to calculate an RGBA value for the sample point. Alternatively, interpolation stage 214 can determine that a tri-linear weighting of the eight voxels nearest to the sample point is to be used to calculate an RGBA value for the sample point. These and other interpolation techniques are considered to be well known in the art.

Ordering stage 216 receives sample points each having window coordinates and RGBA values. Ordering stage 216, also referred to as compositing stage 216, combines sample points to generate RGBA values for each pixel to be rendered on the output device. In the case of OpenGL, for example, each sample point generates a fragment. All of the fragments that contribute to a specific pixel location are rendered according to a specified compositing order, which may be, for example either back-to-front or front-to-back. Once a fragment's RGBA value has been determined, the fragment is passed on to fragment operations stage 168 of rendering pipeline 150 for further processing, including rendering on the destination output device.

A more detailed description of the well-known aspects of a volume rendering pipeline can be found in "Introduction to Volume Rendering" by Barthold Lichtenbelt, Randy Crane and Shaz Naqvi, Prentice Hall PTR, 1998, the entirety of which is hereby incorporated by reference herein.

B. Volume Transfer Circuit

Figure 3:
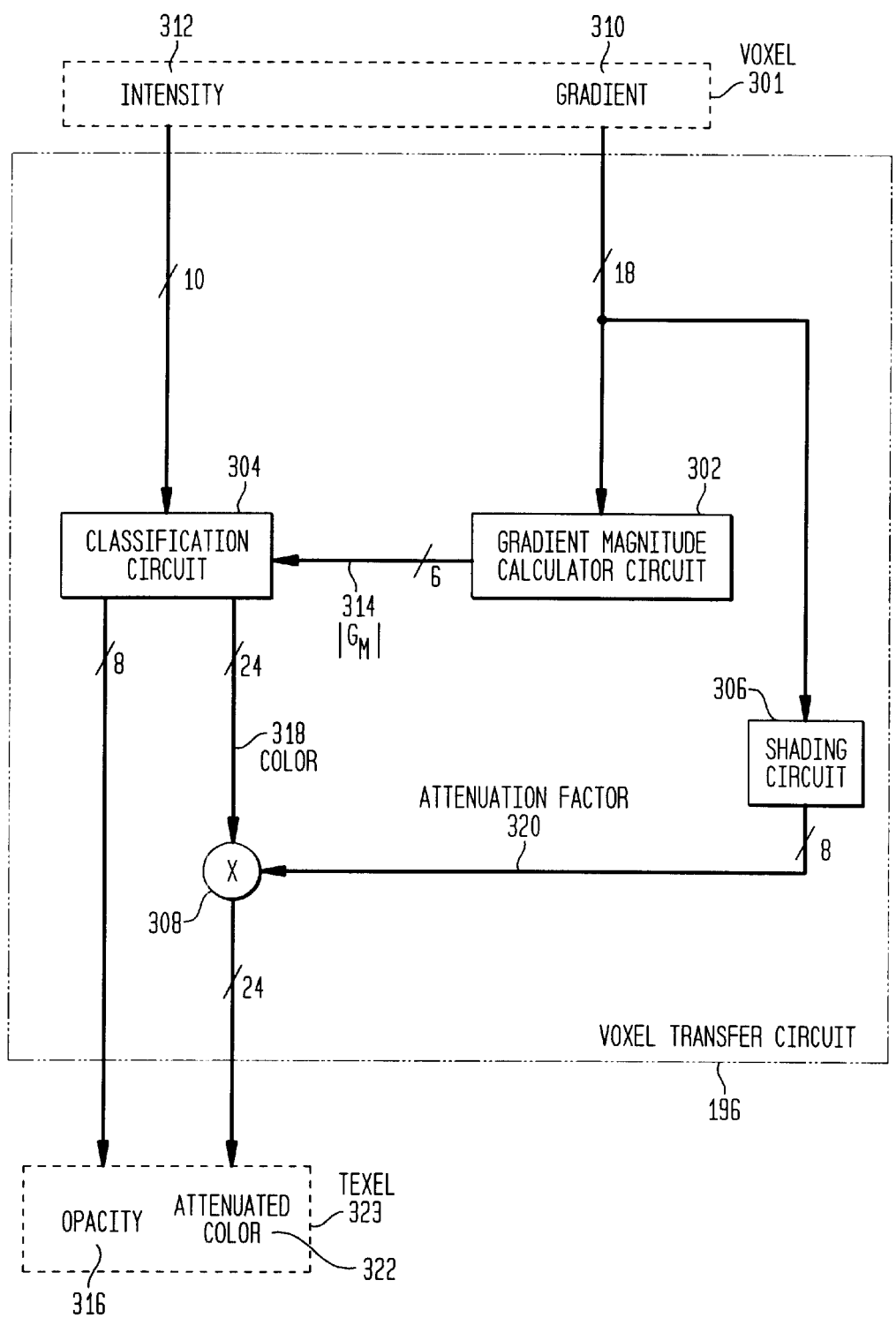
FIG. 3 is a circuit block diagram of one embodiment of the voxel transfer circuit illustrated in FIG. 2.

FIG. 3 is s circuit block diagram of one embodiment of a volume transfer circuit 196 of the present invention. In this embodiment, volume transfer circuit 196 implements circuitry that performs volume transfer stages 218 noted above. That is, volume transfer circuit 196 implements circuitry to perform operations corresponding to gradient computation stage 204, classification stage 206 and lighting stage 208. As noted with reference to FIG. 1B, volume transfer circuit 196 can be implemented in an imaging pipeline 184 to augment a texture mapping unit 192 to perform accelerated volume rendering operations at texture mapping speeds.

Generally, voxel transfer circuit 196 receives as an input a voxel 301 and generates a texel 323 for storage in texture mapping memory 194. Voxel transfer circuit 196 can be implemented immediately after a texel or voxel is retrieved from texture mapping memory 194. As such, both, voxel 301 and texel 323 are, in one embodiment, 32-bit words. The format of voxel 301 and texel 323 are described below with reference to FIGS. 4A and 4B, respectively.

FIG. 4A is a diagram of one embodiment of a voxel 301 for which voxel transfer circuit 196 is configured to process as described below. Voxel 301 is, in this example, a 32-bit value including an intensity value 402 and a gradient value 404. Intensity value 402 represents a brightness or color of the sample point in the object being modeled by volume data set 140. Intensity 402 is typically assigned a value when volume data set 140 is generated. Intensity 402 includes a 10-bit scalar value 412 corresponding to the intensity of voxel 301, and a 2-bit index value 414 that call be used to differentiate between voxels. For example, index value 414 can be used to distinguish between two voxels 301 having a same intensity value. In one embodiment, when used in conjunction with OpenGL, the index value 414 can be used as a tag for an OpenGL "material property". That is, index 414 indicates the type of material from which a voxel 301 reflects and, therefore, an indication of the kind of material the voxel 301 itself represents. Alternatively, index value 414 may be omitted, in which case the 14-bit intensity field 402 can consist entirely of intensity scalar value 412. Other formats may also be used.

Voxel 301 also includes a gradient value 404. Gradient value 404 includes an X component ($G_X$) 410, a Y component ($G_Y$) and a Z component ($G_Z$). It should be noted that voxel 301 can be stored in a memory device located in voxel transfer circuit 196, or can be located in system memory and received from the system over data path 174. Such implementations depend on the function of the implementing architecture.

FIG. 4B is a diagram showing the structure of a texel 323 in accordance with one embodiment of the present invention. It should be understood that the structure of texel 323 generated by voxel transfer circuit 196 should be suitable for the implementing texture mapping unit 192 or other component of graphics system 100 with which voxel transfer circuit 196 shares an interface. Texel 323 is a 32-bit value containing an opacity value 316, a red value 454, a green value 456 and a blue value 458. The red, green and blue values are each 8-bit values and together comprise a 24-bit color value 322. Each individual value is an 8-bit value in this illustrative example. Texel 323 can be stored and manipulated in rendering pipeline 150 as is customary for other texels. Thus, volume transfer circuit 196 processes each voxel 301 of a volume data set 140 to generate a corresponding texel 323.

Returning to FIG. 3, one embodiment of the structure and operation of voxel transfer circuit 196 will now be described in detail. For each voxel 301 in volume rendering set 140, classification circuit 304 generates a texel 323 having an opacity value 316 and color value 322 based on one or more properties of voxel 301 including the local gradient magnitude of the voxel and a lighting model. The relationship between these values is, as noted, referred to herein as a classification or transfer function. In the present invention, voxel transfer circuit 196 implements a transfer function that employs a gradient-influenced classification. Such a transfer function generates opacity values 316 and color values 318 (that is, a texel 323) of structures with excellent edge and surface discrimination. Preferably, and in the disclosed embodiment, voxel transfer circuit 196 also includes the influence of a lighting model to the voxel. In this embodiment, an improved three-dimensional clarity and depth cues can also be provided.

Voxel transfer circuit 196 primarily includes a gradient magnitude calculator circuit 302, a classification circuit 304 and a lighting circuit 306. Gradient magnitude calculator circuit 302 receives an 18-bit signal corresponding to gradient 310 of voxel 301. Magnitude calculator 302 calculates the magnitude of gradient 310. Magnitude calculator circuit 302 generates a signal corresponding to, in this embodiment, the six most significant bits of the calculated gradient magnitude 314. Gradient magnitude 314 is provided to classification circuit 304 for processing as described below. As will be described in detail below, in accordance with aspects of the present invention, voxel transfer circuit 196 can cause the re-rendering of a volume data set with a different opacity value at a processing rate equivalent to other graphics rendering operations, providing a dynamic, interactive volume rendering environment. One exemplary circuit implementation of gradient magnitude calculator circuit 302 is described below with reference to FIG. 5.

Classification circuit 304 receives gradient magnitude signal 314 generated by magnitude calculator circuit 302 and, in this embodiment, the 10 most significant bits of intensity 312 of voxel 301. Classification circuit 304 implements the noted transfer function to generate gradient-influenced values of opacity 316 and color 318. The transfer function can be implemented in any suitable circuitry, firmware, ASIC or the like. In one embodiment, the transfer function is implemented as one or more look-up tables (LUTs). For example, in one embodiment described below with reference to FIG. 6, classification circuit 304 can be implemented as a 16-bit LUT with each entry providing opacity and color values associated with a certain combination of intensity and gradient magnitude values. In alternative embodiments, classification circuit 304 is implemented in two LUTs each of which receives intensity 312 and gradient magnitude 314 signals. One LUT generates an opacity value while the other generates a color value 318. Classification circuit 304 generates an 8-bit signal 316 corresponding to opacity 316. The contents of opacity signal 316 are stored directly in an 8-bit opacity field of texel 323. Classification circuit 304 also generates a 24-bit signal 318 corresponding to the RGB color value 322. One example of a classification LUT is described below with reference to FIG. 6.

As noted, voxel transfer circuit 196 also includes a shader circuit 306. Shader circuit 306 receives gradient signal 310 and generates an attenuation factor 320 based on the value of gradient 310 and a lighting model. The gradient includes such factors as, for example, the light that shines on the voxel, the angle between the viewer and the light, the voxel's material properties and the voxel's orientation and position in space.

Shading circuit 306 implements volume rendering pipeline lighting stage 208 described above. It should be noted that, for reasons noted elsewhere herein, shade circuit 306 need not include circuitry that implements high precision calculations. Thus, there are a number of well-known circuit implementations that can be readily used for shading circuit 306. For example, in one embodiment, shading circuit 306 is implemented as a standard normal map shader circuit. In an alternative embodiment, shading circuit 306 is implemented as a standard reflectance map shader. Such circuit implementations are considered to be well-known in the art and, therefore, are not described further herein.

Shader circuit 306 generates an 8-bit attenuation factor signal 320. This signal and color signal 318 generated by classification circuit 304 are input to a multiplier 308 that generates a product of the two values, referred to herein as an attenuated color signal 322. Thus, shading circuit 306 generates a factor 320 that attenuates the color value 318 to reflect the influence of the lighting model. This provides improved three-dimensional clarity and depth cues.

The individual components of attenuated color signal 322 are stored in their respective fields of texel 323. That is, the attenuated red color is stored in the 8-bit red field 454, the attenuated green color component is stored in the 8-bit green color field 456 and the attenuated blue color is stored in the 8-bit blue color field 458. In this embodiment wherein voxel transfer circuit 196 augments texture mapping unit 192, texel 323 generated by voxel transfer circuit 196 can be stored in texture mapping memory 194 or otherwise processed by rendering pipeline 150. Alternatively, voxel transfer circuit 196 can be implemented as part of a graphics adapter card in a high-end workstation, personal computer, etc. Such applications of volume transfer circuit 196 should be apparent to those of ordinary skill in the art after having read the current disclosure. The resulting texels 323 corresponding to the rendered volume data set 116 have a color and opacity that enable the operator to display internal structures of a displayed object with improved edge and surface discrimination as well as improved depth cues and three-dimensional clarity.

C. Gradient Magnitude Calculator Circuit

FIG. 5 is a schematic circuit diagram of one embodiment of gradient magnitude calculator circuit 302 introduced above with reference to FIG. 3. As noted, gradient magnitude calculator circuit 302 calculates the magnitude 314 of gradient 310. Referring now to FIG. 5, gradient magnitude calculator circuit 302 implements simple and fast circuitry to calculate the gradient magnitude as shown in equation (1):

$$G_M = \left| \sqrt{G_X^2 + G_Y^2 + G_Z^2} \right| \quad \text{Equation (1)}$$

In equation (1), $G_M$ is the magnitude of the gradient component, and $G_X$, $G_Y$ and $G_Z$ are the x-, y- and z- gradient components, respectively.

X gradient 310A of voxel 301 is input to both a first input and a second input of a multiplier 502. Similarly, gradient 310B of voxel 301 is input to first and second inputs of a second multiplier 504, and Z gradient 310C of voxel 301 is input to first and second inputs of a multiplier 506. Multiplier 502 calculates the product of its inputs, generating a signal 514 corresponding to the square of X gradient 310A. Similarly, multiplier 504 multiplies its two inputs to generate a signal 516 corresponding to the square of the Y gradient 310B. Also, multiplier 506 multiplies its two inputs to generate a signal 520 corresponding to the square of the Z gradient 310C.

The output of multiplier 502 is coupled to a first input of an adder 508. The output of multiplier 504 is coupled to a second input of adder 508. Adder 508 adds the signals received at its inputs to generate a signal 518 corresponding to the sum of squared X gradient 514 and the squared Y gradient 516. The output of adder 508 is coupled to an input of a second adder 510. The output of multiplier 506 is coupled to a second input of adder 620. Adder 610 adds signals 518 and 520 received at its inputs to generate a signal 522 corresponding to the sum of the squared X, gradient 310A, squared Y gradient 310B and squared Z gradient 310C. The output of adder 510 is coupled to an input of a square root calculator circuit 512. Square root calculator 512 generates an output signal 314 corresponding to the square root of the sum of the squares of the X gradient, Y gradient and Z gradient. Square root calculator 512 can be implemented in any well-known circuitry that performs the noted operations. In one embodiment, square root calculator 512 is implemented in a look-up table. More generally, the elements of the circuit illustrated in FIG. 5 may be implemented with any well-known and commonly available circuit component, implemented in an ASIC or other equivalent structure. In an alternative embodiment, gradient magnitude calculator circuit 302 can be implemented with a look-up table in which gradient magnitude values are associated with component coordinate values.

In one embodiment, gradient magnitude calculator circuit 302 calculates gradient magnitude 314 of each voxel 301 location in real-time. However, as is well-known, to compute the gradient, neighborhoods of voxels are considered. A well-known observation is that volume data typically does not change. As such, its gradient does not change as well. Because of this, the gradient can be pre-computed by the graphics application 106 or elsewhere. Although such an approach would require additional memory to store such pre-computed gradient data, it is a reasonable tradeoff that can, when used in connection with the present invention, improve volume rendering performance.

D. Classification Circuit

As noted, classification circuit 304 assigns a color value 318 and an opacity value 316 to each voxel 301 in a volume data set 301. In the disclosed embodiments, color value 318 consists of red, green and blue (RGB) color values. Opacity value 316 ranges between 0 and 1 and represents the percentage of light impinging on a voxel 301 that will be absorbed by that voxel. In one embodiment classification circuit 502 can be implemented as a simple circuit accessing a look-up table stored, preferably, in RAM included in classification circuit 502. FIG. 6 is a diagram of a classification look-up table in accordance with one embodiment of the present invention.

Referring now to FIG. 6, all values in the illustrative classification look-up table 600 are shown in hexadecimal. Classification look-up table 600 includes data associating a unique combination of color 318 and opacity values 316 indexed by intensity index 414, intensity scalar 412 and gradient magnitude 314 of voxel 301. In the table format illustrated in FIG. 6, each data association is represented by a row of data. For each row, there is an opacity field 608 in which opacity values 316 are stored, and red, green and blue color fields 610, 612 and 614 for storing a respective red, green and blue color value. Thus, in this illustrative arrangement, each row of look-up table 600 contains a unique combination of opacity and RGB color values. As an example, for a table index 602 with an index value 414 of zero, a scalar value 412 of 8F, and a gradient magnitude 314 of 3F, the corresponding texel values stored in table 600 are an opacity 316 of zero, a red value of FF, a green value of zero, and a blue value of zero. It should be understood that alternative embodiments of this approach may be implemented, and that classification circuit can be any well-known circuit that receives index, scalar and gradient magnitude values and utilizes those values as an index into look-up table 500.

In the illustrative embodiment, a 6-bit gradient magnitude 314 is used in a 16-bit LUT 600. Values of this accuracy are all that is required to provide the maximum resolution required for nearly all components and results. Thus, significant improvements in the volume rendering processes can be achieved by the present invention utilizing values represented by a minimal number of bits, reducing the size and cost of the required circuitry. Furthermore, since traditional texture mapping units often include 16-bit LUTs, voxel transfer circuit 196 can be modified with the appropriate routing and control logic to implement a classification LUT of classification circuit 304 in texture mapping unit 192. The present invention, therefore, is relatively easily and inexpensive to implement and provides significant improvements in volume rendering processing speeds.

Using an appropriate user interface, an operator can modify a transfer function used by voxel transfer circuit 196, and to cause the volume data set to be re-rendered using the modified transfer function. In contrast to conventional volume rendering systems, which typically require at least several seconds if not minutes to render a large volume data set, the high rendering speed provided by voxel transfer circuit 196 enables re-rendering of the volume data set to complete in near real time, as a result, the operator can gradually modify the transfer function in small increments and view the results of the modification in a sequence of volume-rendered frames that are rendered quickly enough to appear animated, thus greatly enhancing the interactivity of the operator's experience. In a medical application, for example, in which the volume data set 140 represents a human head, the operator could interactively modify the transfer function to gradually look through the skull, revealing structures at different depths of the head.

While various embodiments of the present invention have been described above, it should be understood that they have been presented by way of example only, and not limitation. For example, in the above description the augmented texture-mapping unit is a three-dimensional texture mapping system. However, it should be understood that the present invention may be implemented in either two- or three-dimensional texture mapping systems. Thus, the breadth and scope of the present invention are not limited by any of the above-described exemplary embodiments, but are defined only in accordance with the following claims and their equivalents.

What is claimed is:

1. A voxel transfer circuit for processing a volume element, the volume element comprising an intensity component and a gradient component, comprising:

a gradient magnitude calculator circuit constructed and arranged to receive a signal corresponding to the gradient component of the volume element, and to generate a signal corresponding to a magnitude of the received gradient component; and a classification circuit constructed and arranged to receive a signal corresponding to the intensity component of the volume element and the gradient magnitude signal, and to generate, based on the intensity component of the volume element and the magnitude of the received gradient component, a first signal corresponding to an opacity value and a second signal corresponding to a color value, where the opacity and color values comprise a texel for rendering the volume element.

2. The voxel transfer circuit of claim 1, further comprising:

a shader circuit constructed and arranged to receive the gradient component signal and to generate a signal corresponding to an attenuation factor based on the received gradient component and a lighting model; and a multiplier constructed and arranged to receive the color value signal and the attenuation factor signal, and to generate a signal corresponding to the product of the color value and the attenuation factor.

3. The voxel transfer circuit of claim 2, wherein the shader circuit is implemented with a normal map shader circuit.

4. The voxel transfer circuit of claim 2, wherein the shader circuit is implemented with a reflectance map shader circuit.

5. The voxel transfer circuit of claim 1, wherein the graphics system further comprises a texture memory configured to store texels generated by the classification circuit.

6. The voxel transfer circuit of claim 1, wherein a memory cell for storing a texel receives the signal corresponding to the opacity value and the signal corresponding to the color value.

7. The voxel transfer circuit of claim 1, wherein the classification circuit comprises:

means for storing an array of data associating texel opacity and color values with volume element intensity and gradient magnitude values.

8. The voxel transfer circuit of claim 7, wherein the means for storing an array of data comprises at least one look-up table.

9. The voxel transfer circuit of claim 1, wherein the voxel transfer circuit is implemented in a volume rendering pipeline of a computer graphics system.

10. The voxel transfer circuit of claim 1, wherein the voxel transfer circuit is implemented in a texture mapping system of a computer graphics system.

11. A volume rendering system comprising:

a voxel transfer circuit constructed and arranged to process a volume element including an intensity component and a gradient component, the voxel transfer circuit comprising:

a gradient magnitude calculator circuit constructed and arranged to receive a signal corresponding to the gradient component of the volume element, and to generate a signal corresponding to a magnitude of the received gradient component; and a classification circuit constructed and arranged to receive a signal corresponding to the intensity component of the volume element and the gradient magnitude signal, and to generate, based on the intensity component of the volume element and the magnitude of the received gradient component, a first signal corresponding to an opacity value and a second signal corresponding to a color value, where the opacity and color values comprise a texel for rendering the volume element.

12. The volume rendering system of claim 11, wherein the voxel transfer circuit further comprises:

a shader circuit constructed and arranged to receive the gradient component signal and to generate a signal corresponding to an attenuation factor based on the received gradient component and a lighting model; and a multiplier constructed and arranged to receive the color value signal and the attenuation factor signal, and to generate a signal corresponding to the product of the color value and the attenuation factor.

13. The volume rendering system of claim 12, wherein the classification circuit comprises:

means for storing an array of data associating texel opacity and color values with volume element intensity and gradient magnitude values.

14. A volume rendering system configured to implement a volume rendering pipeline, the volume rendering system comprising:

a texture mapping unit;

a texture mapping memory, operatively coupled to the texture mapping unit, for storing texels; and a voxel transfer circuit for processing a volume element, the volume element comprising an intensity component and a gradient component, comprising:

a gradient magnitude calculator circuit constructed and arranged to receive a signal corresponding to the gradient component of the volume element, and to generate a signal corresponding to a magnitude of the received gradient component; and a classification circuit constructed and arranged to receive a signal corresponding to the intensity component of the volume element and the gradient magnitude signal, and to generate, based on the intensity component of the volume element and the magnitude of the received gradient component, a first signal corresponding to an opacity value and a second signal corresponding to a color value, where the opacity and color values comprise a texel for rendering the volume element.

15. The volume rendering system of claim 14, wherein the voxel transfer circuit further comprises:

a shader circuit constructed and arranged to receive the gradient component signal and to generate a signal corresponding to an attenuation factor based on the received gradient component and a lighting model; and a multiplier constructed and arranged to receive the color value signal and the attenuation factor signal, and to generate a signal corresponding to the product of the color value and the attenuation factor.

16. A circuit-based method for processing each of a plurality of voxels in a volume data set to generate a corresponding texel, each voxel comprising an intensity component and a gradient component, the method comprising:

determining a magnitude of the gradient component;

determining an opacity of the corresponding texel based on the intensity component and the magnitude of the gradient component; and determining a color of the corresponding texel based on the intensity component and the magnitude of the gradient component.

17. The method of claim 16, wherein the gradient component is comprised of x-, y- and z-components, and wherein determining a magnitude of the gradient component comprises:

calculating the magnitude of the gradient component using the relationship:

$$G_M = \left| \sqrt{G_X^2 + G_Y^2 + G_Z^2} \right|,$$

where, $G_m$ represents the magnitude of the gradient component, and $G_x$, $G_y$ and $G_z$ represent the x-, y- and z-components, respectively.

18. The method of claim 16, wherein determining the opacity of the corresponding texel comprises:

storing in a memory device a plurality of data associations, each such data association comprising a plurality of voxels and corresponding texels; and retrieving from the memory device opacity and color values which are associated with the intensity and gradient magnitude values of the voxel, wherein the retrieved opacity and color values comprise the corresponding texel.

19. The method of claim 18, wherein storing in a memory device a plurality of data associations comprises:

storing in a look-up table the voxels and corresponding texels, wherein the look-up table is indexed by a combination of voxel intensity and gradient magnitude values.

20. The method of claim 17, further comprising:

determining an attenuation factor based on the gradient component and in accordance with a lighting model; and determining a product of the color value and the attenuation factor to generate an attenuated color value, wherein the attenuated color value and the opacity value comprise the corresponding texel.

* * * * *